Feb. 18, 1930.   E. GOLDBERG   1,747,705
FILM FEEDING DEVICE
Filed Jan. 9, 1925

Inventor
Emanuel Goldberg
By his Attorney Geo. C. Heinicke

Patented Feb. 18, 1930

1,747,705

UNITED STATES PATENT OFFICE

EMANUEL GOLDBERG, OF DRESDEN, GERMANY, ASSIGNOR TO ZEISS IKON AKTIEN-GESELLSCHAFT, OF DRESDEN, GERMANY

FILM-FEEDING DEVICE

Application filed January 9, 1925, Serial No. 1,419, and in Germany January 16, 1924.

The present invention relates to improvements in the film feeding devices for motion-picture apparatus, cinematographs, etc., and it is the principal object of my invention to provide a device for positively compensating the shocks incident to the intermittent feeding of the film, and intended to replace the customary fly wheel at present in use for this purpose.

Another object of the invention is the provision of a compensating spring for the feeding devices of motion-picture apparatus having an average tension which is less than the force required to feed the film.

A further object of the invention is the provision of a spring for the feeding devices of cinematographs or the like machines having an average tension which is equal to half the force required to feed the film.

A still further object of my invention is the provision of a spring for the feeding device of camera films which at one end is attached to the film feeder and at its opposite end to a part of the camera.

These and other objects and advantages of my invention will become more fully known as the description proceeds, and will then be specifically pointed out in the appended claims.

In the accompanying drawing, forming a material part of this disclosure:

Figure 1:
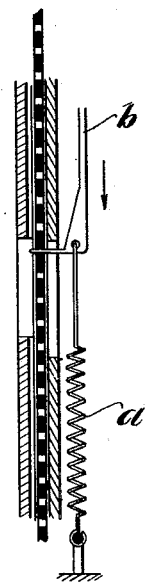
Figure 1 is a fragmentary side elevation of a film feeding device constructed according to the present invention in position at the beginning or start of a film feeding period, with the spring fully tensioned.
Figure 2:
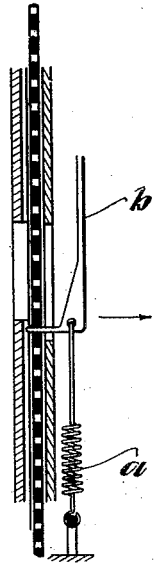
Figure 2 is a view similar to Figure 1 with the parts in the position they occupy at the end of the film feeding period, and the spring in its position of rest.

In the drawing, $b$ designates the film feeding pawl operated in the usual well known manner, to the lower end of which one end of a spring $a$ is secured, the opposite end of which is attached to a part of the motion-picture camera.

Figure 3:
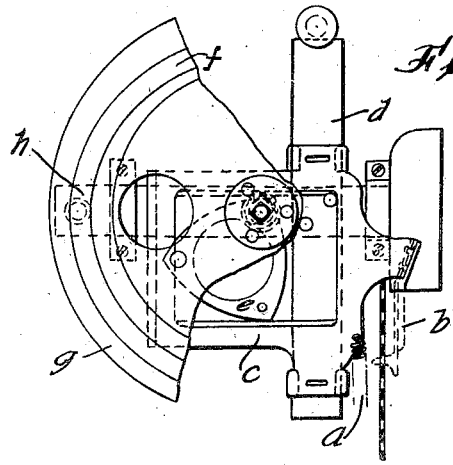
Figure 3 illustrates a film feed equipped with a compensation spring arrangement constructed according to the present invention.

As shown in Figure 3, the film feeding pawl $b$ is carried on a frame $c$ sliding along a guide $d$ and the frame is vertically reciprocated by means of an eccentric $e$, while an eccentric curve $f$ on a fly-wheel $g$ engaged with a frame $h$ effects an intermittent engagement and disengagement of the pawl with and from the film band $i$.

It will be clear from the above described construction, that the film feeding means operate intermittently and are positively driven throughout all portions of its cycle of movement and that spring $a$ is so arranged that it exerts force on the feeding pawl in the same direction, as that in which said pawl moves when actually feeding the film, and simultaneously with said feeding.

The operation of the device will become entirely clear from the following explanation:

It is well known that the film in cinematographic machines is periodically stopped and then started again. In the known machines of this kind at present a fly-wheel is employed to compensate for the shocks incident to the stopping and starting operations. These fly-wheels show the disadvantages that they must be made of a comparatively large diameter and comparatively thicker with the increasing size of the machines and thus unduly increased the weight and bulk of such apparatus. In amateur machines of this kind, called moviegraphs, the uniformity of the film feed was jeopardized by making the fly-wheels not heavy and large enough for the purpose, as the makers had the desire to make these machines as light and as handy as possible.

Moreover, peculiar situations are to be met with film producing cameras which are operated by means of springs. If in these cameras the mechanism at the start of a picture taking operation is in a position to start the film feed, the starting spring must be constructed particularly strong, as it must not only start the entire mechanism of the apparatus, but also start the operation or feed of the film.

It will therefore be clear that the differences between the forces required for the smooth operation of the machine, particularly the film feed must be compensated in order to obtain a smooth and uniform feed, and this is done by the arrangement of the spring secured at one end to the feeding pawl for the film and at its opposite end to the casing of the machine. If the feeding mechanism runs idle, the spring will be tensioned and when the feed is going on the spring will assume its position of rest. This spring arrangement is particularly advantageous with power operated machines in which case the spring will greatly facilitate the starting operation, especially if the feeder occupies an unfavorable position in which more power is used than later on during the regular feeding operation. The spring will therefore compensate the two forces, the starting and the operating force and the machine will run smoothly at all times and the film will be uniformly fed at all times owing to the absence of shocks.

The spring is preferably so selected that its force is one half of the force required to feed the film. If for instance a weight of 100 grams is required in order to feed the film properly and within the predetermined time period through the machine, a spring must be used which in its non-tensioned state corresponds to a weight of 40 grams while in its tensioned state it corresponds to a weight of 60 grams so that the median force corresponds to about half of the weight necessary to properly feed the film.

Changes may be made in the arrangement and in the construction of the minor details of my device within the scope of the appended claims without departure from the spirit of my invention.

Having thus described my invention, what I claim as new and desire to secure by Letters Patent is:

1. In a film feeding device a film feeding pawl, a means for intermittently driving said film feed, a means for positively driving said feed throughout all portions of its cycle of movement, a coil spring secured near the lower end of said pawl, and attached at its opposite end to the camera, exerting force on said feeding pawl in the same direction as that in which said pawl moves when feeding the film, and simultaneously with said feeding, said coil spring of a tension adapted to compensate the difference between the forces required during the idle and the film feeding movements to avoid shocks, and to ensure a uniform feed at all times.

2. In a motion picture apparatus comprising mechanism for engaging and moving a film intermittently whereby greater power is required to operate the mechanism when the film is being moved than when it is still, means tending to render uniform the power required by the mechanism and comprising an instrumentality and having the property of transforming kinetic into static energy and of reconverting it into kinetic energy connected to the mechanism, whereby the mechanism, by its movement, will store power in the instrumentality when the film is not being moved and the instrumentality will expand power assisting in the movement of the mechanism when the film is being moved.

Signed at Dresden, Saxony, Germany, this 15th day of December, A. D. 1924.

Professor Dr. EMANUEL GOLDBERG.